US012485729B2

(12) United States Patent
Nayak

(10) Patent No.: US 12,485,729 B2
(45) Date of Patent: Dec. 2, 2025

(54) METHOD OF OPERATING A VEHICLE AIR-CONDITIONING SYSTEM HAVING A CENTRIFUGAL-TYPE ELECTRIC REFRIGERANT COMPRESSOR

(71) Applicant: Garrett Transportation I Inc., Torrance, CA (US)

(72) Inventor: Ankur Nayak, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 197 days.

(21) Appl. No.: 18/346,801

(22) Filed: Jul. 4, 2023

(65) Prior Publication Data

US 2024/0391298 A1 Nov. 28, 2024

(51) Int. Cl.
*B60H 1/32* (2006.01)

(52) U.S. Cl.
CPC ..... *B60H 1/3205* (2013.01); *B60H 2001/325* (2013.01); *B60H 2001/3257* (2013.01); *B60H 2001/327* (2013.01)

(58) Field of Classification Search
CPC ............ B60H 1/3205; B60H 2001/325; B60H 2001/3257; B60H 2001/327
USPC .......................................................... 701/36
See application file for complete search history.

(56) References Cited

U.S. PATENT DOCUMENTS

| | | | | | |
|---|---|---|---|---|---|
| 5,363,674 | A | * | 11/1994 | Powell | F04D 17/122 |
| | | | | | 62/505 |
| 5,857,348 | A | * | 1/1999 | Conry | F04D 29/023 |
| | | | | | 417/423.12 |
| 9,459,028 | B2 | * | 10/2016 | Styles | F25B 29/003 |
| 11,466,677 | B2 | * | 10/2022 | Hattori | F04B 35/04 |
| 2014/0208775 | A1 | * | 7/2014 | Styles | F25B 29/003 |
| | | | | | 62/56 |
| 2019/0344636 | A1 | * | 11/2019 | Lee | B60H 1/00885 |

(Continued)

FOREIGN PATENT DOCUMENTS

| DE | 102007024894 A1 | * | 12/2007 | ........... F01K 23/065 |
|---|---|---|---|---|
| DE | 102021210992 A1 | * | 10/2022 | ......... B60H 1/00385 |

(Continued)

OTHER PUBLICATIONS

Pagé, Victor W. Automobile Starting, Lighting and Ignition. 1917. (Year: 1917).*

(Continued)

*Primary Examiner* — Ramya P Burgess
*Assistant Examiner* — Keith A von Volkenburg
(74) *Attorney, Agent, or Firm* — BelayIP

(57) ABSTRACT

An air conditioning system for an electric vehicle includes a refrigerant E-compressor made up of a centrifugal compressor and an electric motor for driving the compressor. The housing of the compressor defines a coolant passage for liquid coolant. A coolant unit pumps liquid coolant through the coolant passage during normal AC system operation to cool the motor. A method for preventing or mitigating harmful effects of liquid refrigerant being ingested by the compressor includes determining whether liquid refrigerant is likely present in the compressor inlet; if so, a heating unit raises the temperature of the liquid coolant to thereby heat and evaporate any liquid refrigerant before starting the compressor. Once the danger of liquid refrigerant is passed, the compressor is started and the heating unit is deactivated.

20 Claims, 6 Drawing Sheets

(56) References Cited

U.S. PATENT DOCUMENTS

| | | | | |
|---|---|---|---|---|
| 2020/0256344 | A1* | 8/2020 | Sakota | F04D 29/057 |
| 2022/0355639 | A1* | 11/2022 | Kim | B60H 1/00814 |
| 2023/0065903 | A1* | 3/2023 | Oh | B60H 1/143 |
| 2023/0158858 | A1* | 5/2023 | Kim | B60H 1/00764 |
| | | | | 62/186 |

FOREIGN PATENT DOCUMENTS

| | | | | | |
|---|---|---|---|---|---|
| JP | 2010196478 | A | * | 9/2010 | |
| KR | 0137362 | B1 | * | 7/1998 | |
| KR | O137362 | B1 | * | 7/1998 | |
| WO | WO-2019087869 | A1 | * | 5/2019 | F04D 29/5826 |
| WO | WO-2021047247 | A1 | * | 3/2021 | F04C 18/16 |

OTHER PUBLICATIONS

Pangestu, Rizky, BernadetaWuriHarini,andIr.FeriYusivar. "TemperatureControlofAirConditioningCompressorSystemonElectricVehicles." 2019IEEEConferenceon EnergyConversion(CENCON). IEEE,2019.165-170.Web. (Year: 2019).*

Page, VictorW. AutomobileStarting,LightingandIgnition. 1917. (Year: 1917).*

Steadman."AirConditionControlforAutomobiles." ProceedingsoftheInstitutionofMechanical Engineers3.1(1949):112-129. Web. (Year: 1949).*

Honda.(n.d.). 1995AccordSedanOnlineReferenceOwner'smanualcontents.https://cdn.dealereprocess.org/cdn/servicemanuals/honda/1995-accord.pdf (Year: 1995).*

Solberg,James,NormanR.Miller,andPredragHrnjak. Asensorforestimatingtheliquidmassfractionoftherefrigerantexitinganevaporator.No. 2000-01-0976.SAETechnicalPaper,2000. (Year: 2000).*

* cited by examiner

METHOD OF OPERATING A VEHICLE AIR-CONDITIONING SYSTEM HAVING A CENTRIFUGAL-TYPE ELECTRIC REFRIGERANT COMPRESSOR

BACKGROUND OF THE INVENTION

This application relates generally to automotive vehicles, and particularly to air conditioning systems for vehicles. The application relates more specifically to electric refrigerant compressors for AC systems in automotive vehicles.

Developments in automotive technology are increasingly moving toward "greener" vehicles that reduce or eliminate carbon emissions, necessitated in some cases by ever more-stringent government-imposed regulations. Various designs for electric vehicles have been proposed and developed, including hybrid electric vehicles (HEVs), plug-in hybrid electric vehicles (PHEVs), and battery electric vehicles (BEVs). All these types of vehicles include a battery as a power source, but in the case of HEVs and PHEVs, the battery is small and is used only for supplementing an internal combustion engine (ICE) that serves as the primary power source for causing the vehicle to move. On the other hand, in BEVs, the battery is quite large and is the sole source for all power needs of the vehicle. Accordingly, in BEVs all the typical equipment that modern vehicles include must derive their power from the battery. This includes the air conditioning system of the vehicle.

A vehicle air conditioning system works by removing heat and moisture from the air inside the passenger cabin, and then circulating cooler and drier air back into the cabin. Vehicle AC systems typically include a compressor, a condenser, an expansion valve, and an evaporator, together with a blower for circulating the cabin air. The compressor is driven to compress and circulate a refrigerant gas (such as R134a) through the system. The compressed refrigerant gas flows through the condenser, which is essentially a heat exchanger that dissipates the heat that the refrigerant has absorbed from the air inside the vehicle cabin. As the refrigerant cools, it condenses into a liquid. The liquid refrigerant then passes through the expansion valve, which regulates the flow of refrigerant and causes it to undergo a substantial drop in pressure and temperature. The cold gaseous refrigerant then passes through the evaporator, which again is essentially a heat exchanger, located inside the vehicle. As the cold, low-pressure refrigerant passes through the evaporator, it absorbs heat from the cabin air circulated over the evaporator by the blower, causing the refrigerant to evaporate and return to a gaseous state. The evaporated refrigerant then circulates back to the compressor.

The AC system continues to circulate the refrigerant, removing heat and moisture from the air inside the vehicle and replacing it with cooler, drier air. The cycle continues until the desired temperature is reached or the air conditioning system is turned off.

Typical modern air conditioning systems also include additional components such as cabin air filters, sensors, and electronic controls to adjust the temperature and airflow.

In a conventional non-electric vehicle, the refrigerant compressor of the AC system is driven by the engine crankshaft via a belt or the like. In recent years, trends are moving toward electric refrigerant compressors (also referred to as refrigerant E-compressors), i.e., compressors that include their own electric motor for driving the compressor. Of course, for BEVs, the refrigerant E-compressor is the only viable option. Furthermore, in BEVs the refrigerant E-compressor may also be used for cooling various power electronics and/or the main battery of the vehicle.

Vehicle AC systems in general are susceptible to collection of liquid refrigerant in front of the compressor when the vehicle is switched off for extended periods, particularly when the ambient temperature is relatively low. This does not pose any serious problems for mechanically driven scroll-type refrigerant compressors, as are typical in conventional gasoline and diesel engine-powered vehicles, because scroll-type compressors are robust and can readily tolerate liquid refrigerant; moreover, there is abundant motive power available from the engine crankshaft to drive the compressor.

For a refrigerant E-compressor in a BEV, on the other hand, a collection of liquid refrigerant in front of the compressor wheel can cause an increase in required starting torque that exceeds what the dedicated electric motor can deliver, leading to a failure of the compressor to start. Additionally, the large capacity required of some refrigerant E-compressors (necessitated by the multiple roles of the compressor in providing cooling for cabin air as well as cooling of power electronics and main battery) means that E-compressors of centrifugal type are attractive. Ingestion of liquid refrigerant by such centrifugal E-compressors can damage them.

There is a need for improvements in vehicle AC systems that can substantially reduce or eliminate the problem of failure to start and/or compressor damage in centrifugal-type refrigerant E-compressors.

SUMMARY OF THE DISCLOSURE

In accordance with one embodiment of the invention, a method is described for operating a vehicle AC system in a vehicle having an engine control unit (ECU), the vehicle AC system including a centrifugal-type refrigerant E-compressor operable to receive a refrigerant fed through an inlet to the refrigerant E-compressor and including a heating unit in heat transfer communication with the inlet. The method comprises the steps, directed by the ECU, of:
  starting the vehicle in response to an ignition switch operation;
  receiving an AC start signal indicating that the AC system is to be activated;
  issuing a command to operate the heating unit to cause heat transfer to the refrigerant in the inlet to cause vaporization of liquid refrigerant;
  delaying starting of the refrigerant E-compressor after receipt of the AC start signal as long as a compressor start criterion is unmet; and
  once said compressor start criterion is met, issuing a command to start the refrigerant E-compressor.

In one embodiment, the compressor start criterion is based on a temperature Tc measured at an inlet to the refrigerant E-compressor. Advantageously, the compressor start criterion additionally can be based on a pressure Pc measured at the inlet to the refrigerant E-compressor. From the temperature and pressure of the refrigerant at the inlet to the compressor, the ECU can determine a state of the refrigerant at the inlet. The compressor start criterion can then be based on the state of the refrigerant.

In a particular embodiment, the ECU determines whether or not the compressor start criterion is met based on a calculated liquid fraction of the refrigerant. If the calculated liquid fraction of the refrigerant does not exceed a predetermined level, then the ECU determines that the compressor start criterion is met, and then starts the compressor.

On the other hand, when the ECU determines that the calculated liquid fraction exceeds the predetermined level, the compressor start criterion is determined to be unmet. In this case, the ECU activates the heating unit to cause vaporization of liquid refrigerant, and delays starting of the compressor.

Once the ECU determines that the compressor start criterion is met as a result of circulation of the heated liquid coolant through the coolant passage in the refrigerant E-compressor, the ECU deactivates the heating unit and issues a command to start the refrigerant E-compressor. After the ECU deactivates the heating unit, the coolant unit continues to circulate liquid coolant through the coolant passage of the refrigerant E-compressor for cooling purposes.

The heating unit in some embodiments can comprise a coolant unit operably coupled with the refrigerant E-compressor, the refrigerant E-compressor defining a coolant passage therein for receiving a liquid coolant from the coolant unit. The heating unit further can include an electrical heating element operable to raise the temperature of the liquid coolant from the coolant unit prior to circulating through the coolant passage. When the ECU determines that the compressor start criterion is unmet, the ECU activates the electrical heating element to heat the liquid coolant to a temperature sufficient to cause vaporization of liquid refrigerant. The electrical heating element can be, for example, an existing PTC heater of the electric vehicle employed primarily for cabin air heating. Warm air blown over the PTC heater can be passed over the coolant tube from the coolant unit for heating the liquid coolant. Accordingly, no additional dedicated heating element is required for implementing the methods of the invention.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

Figure 1:
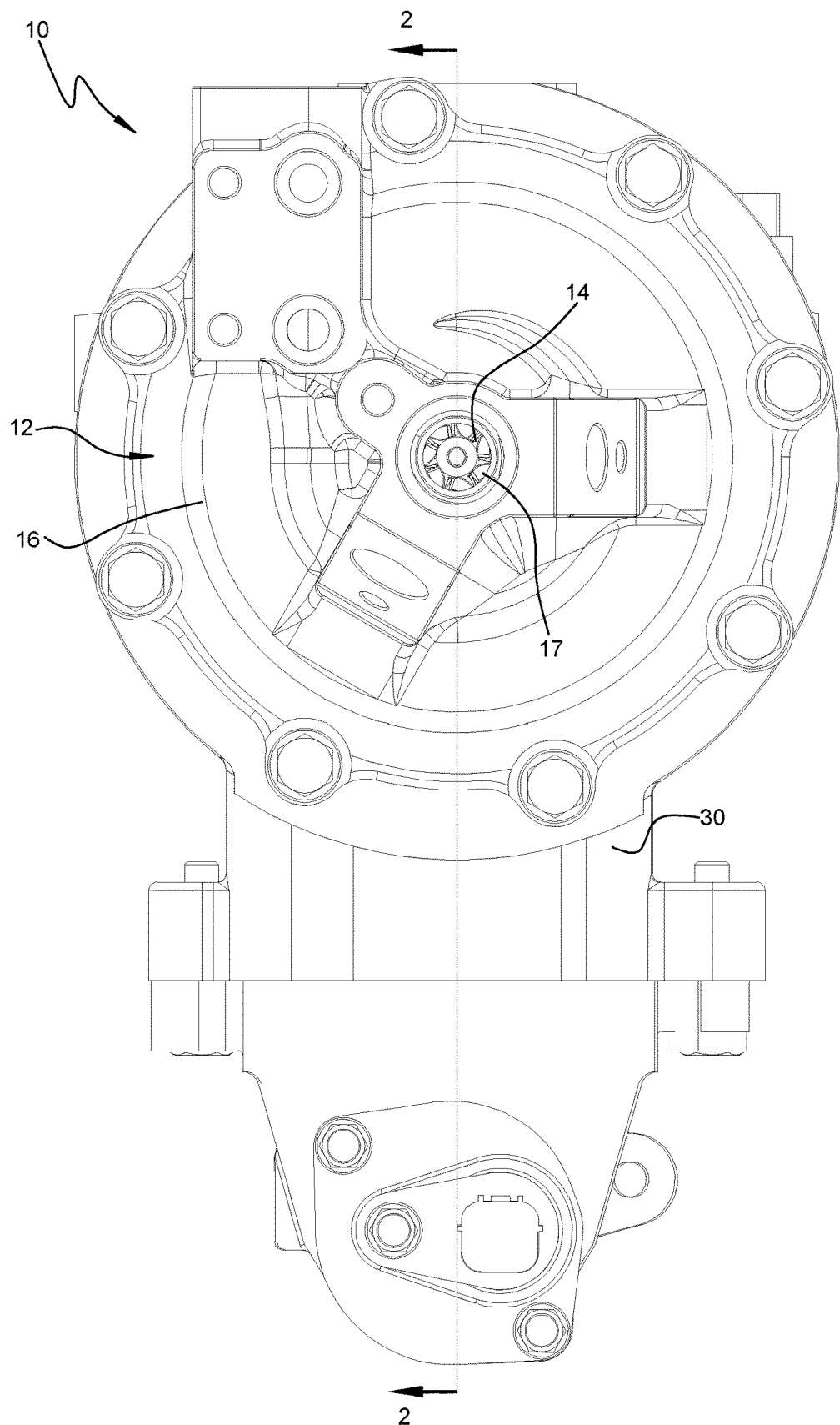
FIG. 1 is an axial end view of a refrigerant E-compressor in accordance with an embodiment of the invention.

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

FIGS. 1-4 depict various views of a centrifugal-type refrigerant E-compressor 10 that can be used in the practice of the present invention. The refrigerant E-compressor comprises a centrifugal compressor 12 coupled with an electric motor 30. The compressor 12 includes a centrifugal compressor wheel 14 contained within a compressor housing 16. The compressor wheel is affixed to a shaft 18. The compressor housing 16 defines a refrigerant inlet 17 through which refrigerant (ideally in a fully gaseous state) is led axially into the compressor wheel 14. The compressor housing also defines a diffuser 20. Refrigerant that has passed through the wheel and has been compressed to a higher pressure is discharged radially outwardly from the wheel and passes through the diffuser into a volute 22 that collects the pressurized refrigerant. From the volute, the pressurized refrigerant is fed through the refrigerant loop of the AC system of a vehicle, as further described below in connection with FIG. 5.

Figure 2:
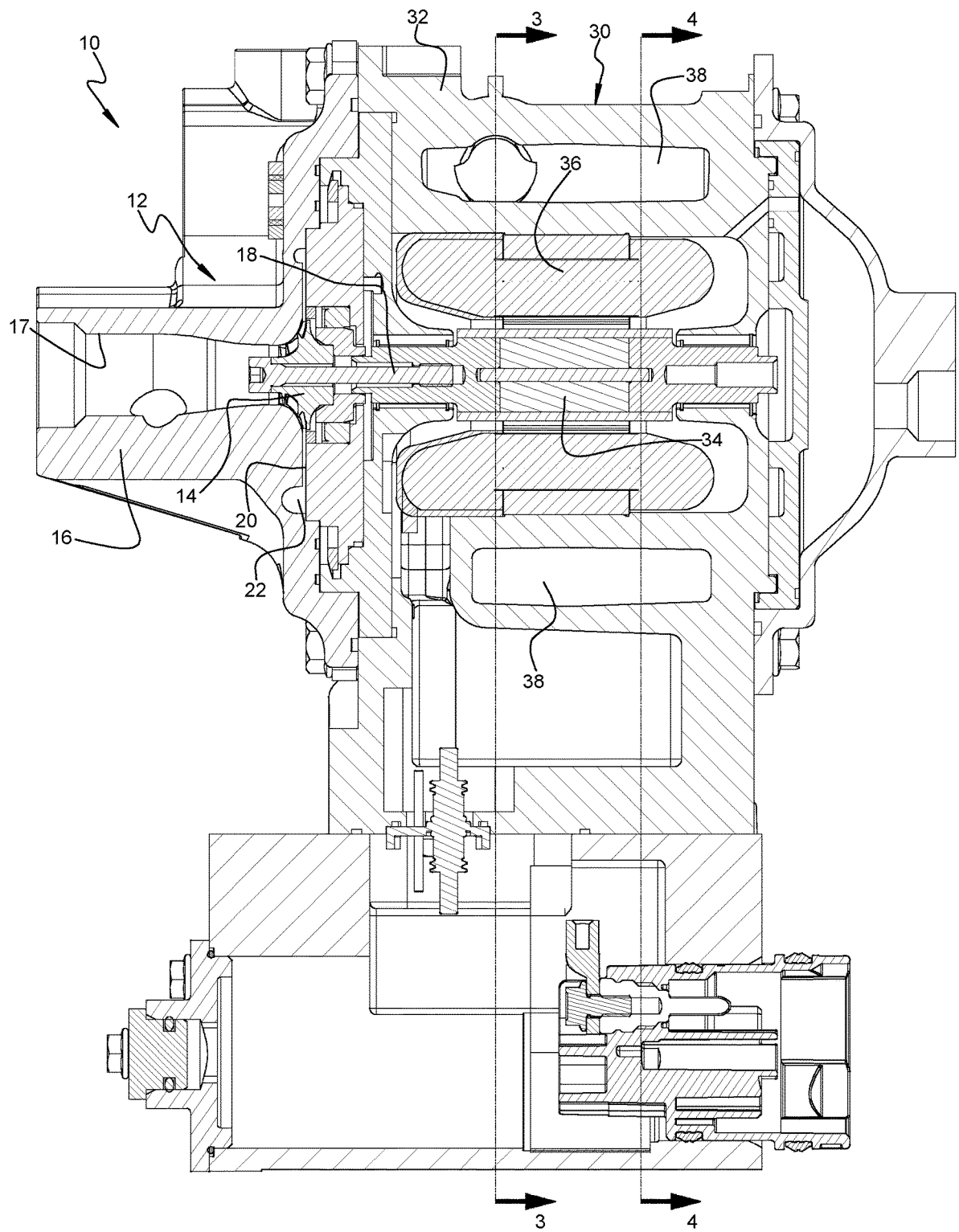
FIG. 2 is a cross-sectional view along line 2-2 in FIG. 1.
Figure 3:
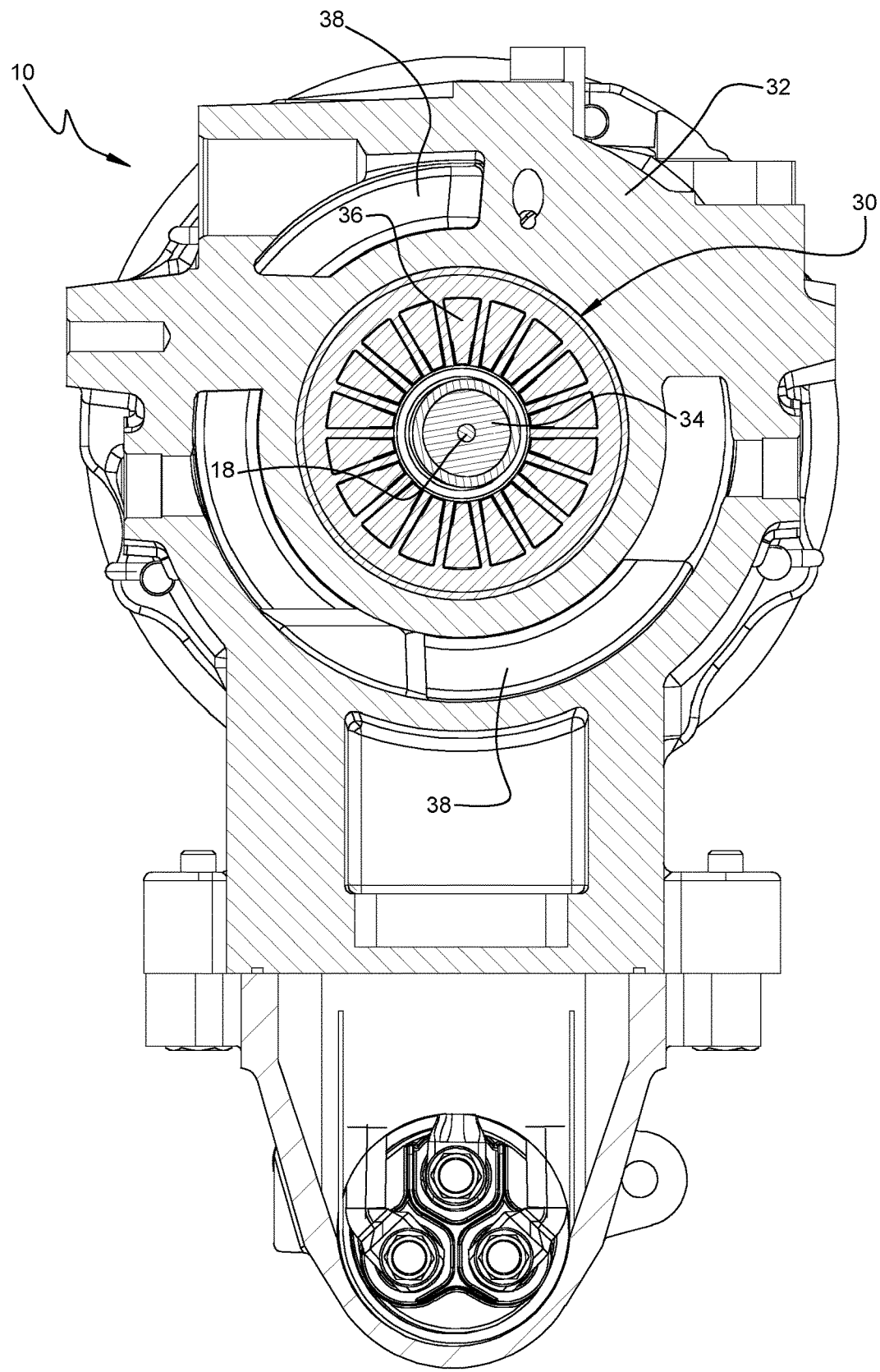
FIG. 3 is a cross-sectional view along line 3-3 in FIG. 2.
Figure 4:
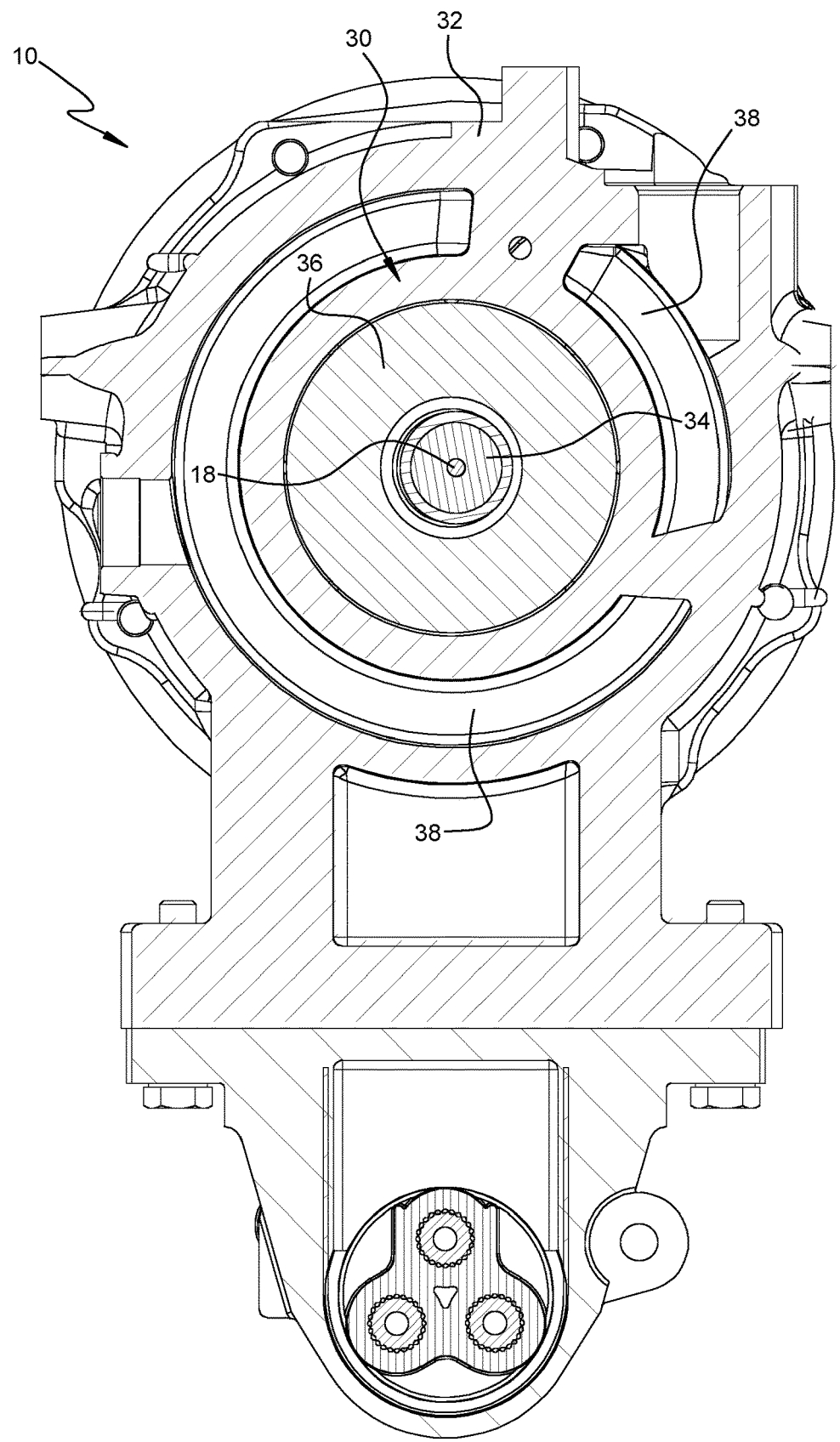
FIG. 4 is a cross-sectional view along line 4-4 in FIG. 2.

The motor 30 for the refrigerant compressor comprises a motor housing 32 that contains the motor components. The motor components include a rotor 34 that surrounds the shaft 18 and is affixed thereto, and a stator 36 that surrounds the rotor. The motor 30 is illustrated and described rather schematically herein because the details of the motor construction and operation are not particularly pertinent to the invention. The important aspect of the motor for present purposes is that it produces heat during operation and hence requires cooling. In the vehicle AC system described herein, such cooling is accomplished using a liquid coolant such as a water and glycol mixture. Accordingly, the motor housing 32 defines a coolant passage 38 through which the liquid coolant is circulated. The coolant passage surrounds the stator 36 and extends axially for a length similar to that of the stator (as best seen in FIG. 2) and extends circumferentially about the stator (as best seen in FIG. 4).

Figure 5:
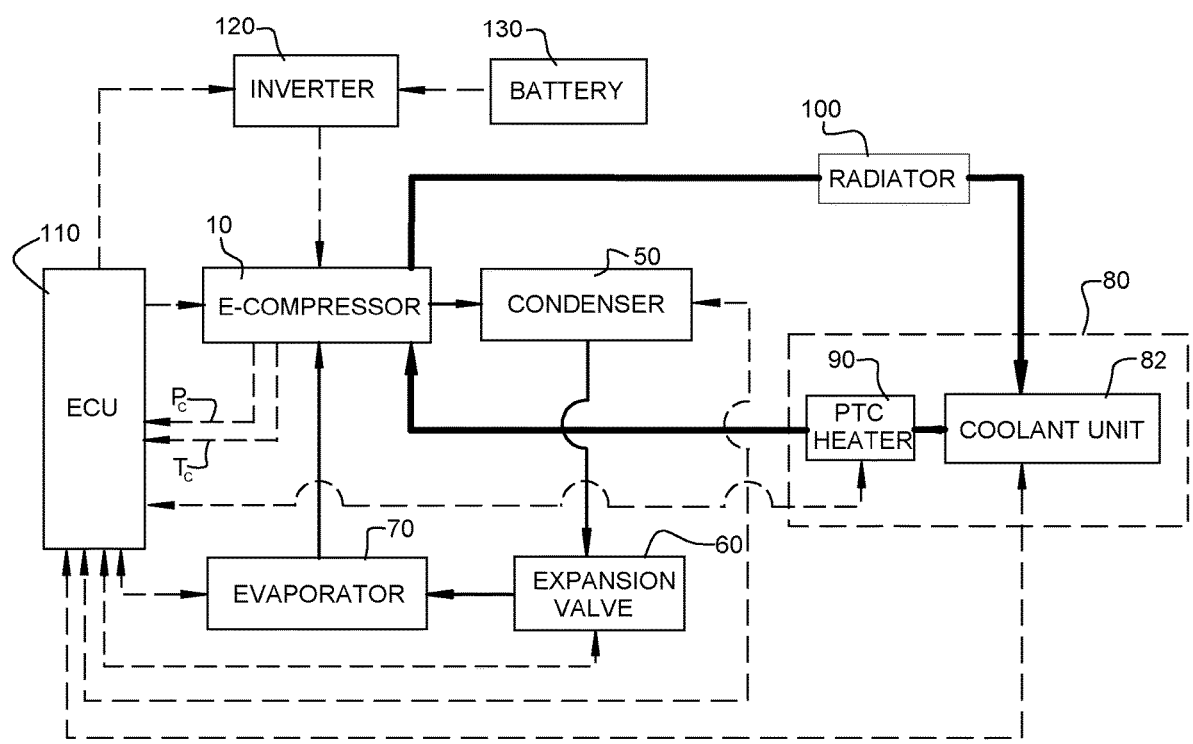
FIG. 5 is a block diagram of a vehicle AC system including a refrigerant E-compressor and a coolant unit operable to circulate liquid coolant through a housing of the refrigerant compressor, to which method embodiments of the invention can be applied.

Turning to FIG. 5's diagrammatic illustration of a vehicle AC system in accordance with embodiments of the present invention, the system includes the refrigerant E-compressor 10 together with a condenser 50, an expansion valve 60, and an evaporator 70. The compressor 10 is driven to compress and circulate a refrigerant gas (such as R134a) through the system. In FIG. 5, the circuit for the refrigerant is shown in narrow solid lines. The compressed refrigerant gas flows through the condenser 50, which is essentially a heat exchanger that dissipates the heat that the refrigerant has absorbed from the air inside the vehicle cabin. As the refrigerant cools, it condenses into a liquid. The liquid refrigerant then passes through the expansion valve 60, which regulates the flow of refrigerant and causes it to undergo a substantial drop in pressure and temperature. The cold gaseous refrigerant then passes through the evaporator 70, which again is essentially a heat exchanger, located inside the vehicle. As the cold, low-pressure refrigerant passes through the evaporator, it absorbs heat from the cabin air circulated over the evaporator by the blower, causing the refrigerant to evaporate and return to a gaseous state. The evaporated refrigerant then circulates back to the compressor.

The above high-level description of the functioning of the AC system assumes that the refrigerant undergoes the desired phase changes completely, changing from a gaseous state in the compressor, to a liquid state in the condenser, and back to a gaseous state in the evaporator. This is generally the case when the AC system is operating normally. However, under some conditions, the refrigerant in front of the compressor may not be 100% gaseous. The state of the refrigerant at the compressor inlet 17 depends on its pressure and temperature. When the vehicle has been switched off for a sustained period of time, the pressure and temperature of the refrigerant at the compressor inlet will be influenced by ambient temperature. If the ambient temperature is sufficiently low, the refrigerant may be in a vapor state, meaning that some fraction of the refrigerant is liquid. The relative size of the liquid fraction depends on how far the refrigerant has cooled below the saturation line that separates the superheated gas region from the saturated vapor region of its characteristic P-T diagram. If the liquid fraction is too high, damage to the compressor and/or failure of the compressor to start can occur. The present invention aims to mitigate or eliminate these drawbacks.

The present invention accordingly includes means for causing vaporization of any liquid fraction of refrigerant at the compressor inlet. In one embodiment said means for causing vaporization of the liquid refrigerant includes a heating unit 80 in heat-transfer communication with the inlet 17 to the E-compressor. The specific embodiment illustrated in FIG. 5 includes a heating unit comprising a coolant unit 82 operable to circulate liquid coolant in a circuit denoted by heavy solid lines in FIG. 5, and a heater 90. The coolant unit includes a reservoir holding a quantity of liquid coolant, and a pump for causing the liquid coolant to circulate about the circuit. The circuit includes the coolant passage 38 in the refrigerant E-compressor. The heater 90 is arranged to heat the coolant flowing from the coolant unit 82 to the compressor to raise the temperature of the coolant. The heater advantageously can be, for example, a PTC (positive temperature coefficient) heater, although other types of heaters alternatively can be used. During normal operation of the AC system, the coolant unit 82 is operated with the heater 90 deactivated so as to provide relatively low-temperature coolant to the compressor 10. The coolant circulated through the compressor's coolant passage 38 absorbs heat transferred from the relatively higher-temperature motor. The coolant then passes through a radiator 100 to reduce the temperature of the coolant before it returns to the coolant unit.

As noted, a liquid fraction of refrigerant may be present in the inlet to the compressor under certain conditions, such as when the vehicle and AC system have been switched off for an extended period and the ambient temperature is relatively low. In such conditions, the coolant unit 82 can be operated with the heater 90 activated to raise the temperature of the liquid coolant before it circulates through the coolant passage of the compressor. The heated coolant causes the motor housing 32 to be raised in temperature, and heat transfer occurs between the motor housing and the compressor housing via conduction. Accordingly, heat transfer occurs between the compressor housing and the refrigerant present in the inlet to the compressor, thereby causing any liquid fraction of refrigerant to be evaporated.

Heating units of other types can be used in the practice of the invention. As one example, a dedicated PTC heater can be disposed in contact with the inlet area of the compressor housing. When activated, the PTC heater raises the temperature of the inlet area of the compressor housing, thereby heating up the refrigerant in the inlet to evaporate any liquid fraction present there.

However, there is an advantage in employing the heating unit 80 comprising the coolant unit 82 and PTC heater 90 in an electric vehicle. Unlike conventional vehicles powered by an internal combustion engine in which there is ample waste heat from the engine available for cabin heating, electric vehicles generally must rely on electric heaters, such as PTC heaters, for cabin heat. Accordingly, since at least one PTC heater is already present in the vehicle, advantage can be taken of its presence, by having the PTC heater do double-duty, serving to provide heating for cabin air, and also serving to heat the coolant when liquid refrigerant must be evaporated. Thus, employing the heating unit 80 avoids the need for an additional dedicated PTC heater.

As also shown in FIG. 5, an engine control unit (ECU) 110 is provided for directing steps of the methods in accordance with embodiments of the invention. Dashed lines in FIG. 5 indicate electric power and/or data cables. Thus, the ECU is in electrical communication with an inverter 120 that receives DC current from a battery 130 and creates AC current that is supplied to the motor of the refrigerant E-compressor 10. The ECU is in data communication with the E-compressor, receiving various signals from sensors that measure parameters associated with the E-compressor. Among those parameters, the ECU receives a temperature Tc and a pressure Pc measured at the inlet of the compressor. From these temperature and pressure values, the ECU is programmed to determine a state of the refrigerant in the inlet, namely, whether the refrigerant is in a superheated gaseous state, or whether it is in a vapor (gas and liquid) state. The refrigerant state can be determined by using a known pressure-temperature characteristic for the particular refrigerant used in the AC system. This P-T characteristic can be stored in a memory unit associated with the ECU. The determination of the state of the refrigerant includes determining the liquid fraction of the refrigerant, such as a percentage of the refrigerant that is liquid, or an equivalent parameter that correlates with the percentage of liquid.

The ECU is also in data communication with the condenser 50, the expansion valve 60, and the evaporator 70. Typically, the ECU will receive at least one pressure measurement signal from each of these components, for the purpose of monitoring and controlling the operation of the AC system, in a manner well known in the art. The ECU is also in communication with the heating unit 80 for monitoring and controlling its operation.

Figure 6:
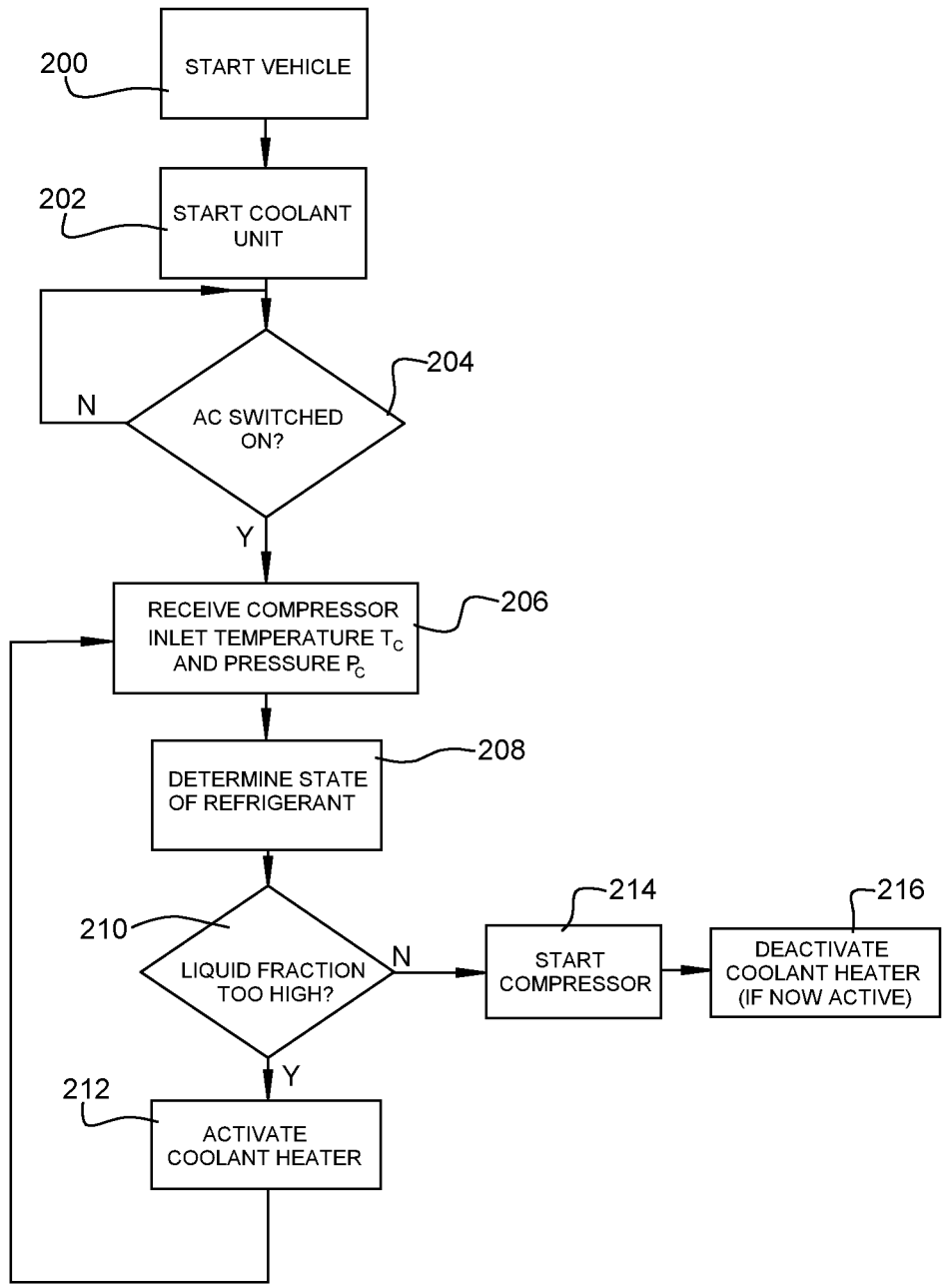
FIG. 6 is a flow chart of a method of operating a vehicle AC system including a refrigerant E-compressor, in accordance with one embodiment of the invention.

With reference to FIG. 6, a method in accordance with one embodiment of the invention is now described. The steps of the method are performed by the ECU, in the sense that the ECU directs each of the steps to be carried out by the various components of the AC system and associated components. The vehicle is started at step 200. Upon starting of the vehicle, the ECU at step 202 commands the coolant unit 82 to start, and liquid coolant begins to circulate about the circuit through the coolant passage in the housing of the E-compressor, through the radiator, and back to the coolant unit. At step 204, the ECU inquires whether a start signal for the AC system has been received; if "YES", then at step 206 the ECU receives the compressor inlet pressure Pc and temperature Tc. At step 208, the ECU determines a state of the refrigerant from the inlet pressure and temperature based on the stored P-T characteristic for the refrigerant. At step 210, the ECU determines whether or not the liquid fraction in the compressor inlet is greater than a maximum allowable threshold value, which would indicate that damage to the compressor and/or a failure of the compressor to start may likely occur. If "YES" (i.e., the liquid fraction is too high), then the ECU at step 212 directs the PTC heater 90 of the heating unit 80 to be activated, and the control returns to step 206.

The loop from step 206 to step 212 continues until the result of the query of step 210 is "NO", in which case the ECU then directs the refrigerant E-compressor to start at step 212. At step 214, then, the ECU deactivates the PTC heater. The coolant unit 82 continues to operate, but after the PTC heater is deactivated, the temperature of the liquid coolant will drop and the coolant will provide cooling for the E-compressor.

The ECU for directing the steps of the methods in accordance with embodiments of the invention may be any means, such as a device or circuitry embodied in hardware, software or a combination of hardware and software, that is configured to perform the corresponding functions of the ECU as described herein. In an exemplary embodiment, the ECU may merely provide additional functionality to a conventional vehicle ECU. However, in some embodiments, the ECU may be a separate unit from the main vehicle ECU and may be in communication with the main ECU.

The ECU includes a memory device. The memory device may include, for example, volatile and/or non-volatile memory. The memory device may be configured to store information, data, applications, modules, instructions, or the like for enabling the apparatus to carry out various functions in accordance with exemplary embodiments of the present invention. For example, the memory device could be configured to buffer input data for processing by the processor of the ECU. Additionally or alternatively, the memory device could be configured to store instructions corresponding to an application for execution by the processor of the ECU.

The processor of the ECU may be embodied in a number of different ways. For example, the processor may be embodied as a processing element, a coprocessor, a controller, or various other processing means or devices including integrated circuits such as, for example, an ASIC (application specific integrated circuit), FPGA (field programmable gate array), a hardware accelerator or the like. In an exemplary embodiment, the processor may be configured to execute instructions stored in the memory device or otherwise accessible to the processor. As such, whether configured by hardware or software methods, or by a combination thereof, the processor may represent an entity capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor, which may otherwise be a general-purpose processing element if not for the specific configuration provided by the instructions, to perform the algorithms and/or operations described herein. However, in some cases, the processor may be a processor of a specific device (e.g., the ECU) adapted for employing embodiments of the present invention by further configuration of the processor by instructions for performing the algorithms and/or operations described herein.

In whatever manner the ECU is configured and implemented, it is programmed with machine-readable instructions for use by the processer to carry out the steps of the methods of the present invention.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A method of operating a vehicle AC system in a vehicle having an engine control unit (ECU), the vehicle AC system including a centrifugal-type refrigerant E-compressor operable to receive a refrigerant fed through an inlet to the refrigerant E-compressor and including a heating unit in heat transfer communication with the inlet, the method comprising the steps, performed by the ECU, of:
   starting the vehicle in response to an ignition switch operation;
   receiving an AC start signal indicating that the AC system is to be activated;
   issuing a command to operate the heating unit to cause heat transfer to the refrigerant in the inlet to cause vaporization of liquid refrigerant;
   delaying starting of the refrigerant E-compressor after receipt of the AC start signal as long as a compressor start criterion based on the refrigerant condition at the inlet is unmet; and
   once said compressor start criterion is met, issuing a command to start the refrigerant E-compressor.

2. The method of claim 1, wherein the compressor start criterion is based on a temperature directly measured at an inlet to the refrigerant E-compressor.

3. The method of claim 2, wherein the compressor start criterion is additionally based on a pressure directly measured at the inlet to the refrigerant E-compressor.

4. The method of claim 3, wherein the ECU is configured to determine a state of the refrigerant at the inlet based on the measured temperature and pressure, and wherein the compressor start criterion being based on the determined state.

5. The method of claim 4, wherein the ECU determines whether or not the compressor start criterion is met based on a calculated liquid fraction of the refrigerant, and wherein the ECU is configured to determine based on the measured temperature and pressure, that the frigerant at the inlet is in a vapor state.

6. The method of claim 5, wherein once the ECU determines that the compressor start criterion is met as a result of heating by the heating unit, the ECU deactivates the heating unit and issues the command to start the refrigerant E-compressor, and wherein the ECU is configured to delay starting of the refrigerant E-compressor, and wherein based on the measured temperature pressure, that the refrigerant at the inlet is in a vapor state.

7. The method of claim 1, wherein the heating unit comprises a coolant unit operably coupled with the refrigerant E-compressor, the refrigerant E-compressor defining a coolant passage configured to receive liquid coolant from the coolant unit, the heating unit further comprising an electrical heating element positioned upstream of the cool passage and operable to raise the temperature of the liquid coolant before circulation through the coolant passage, wherein, when the ECU determines that the compressor start criterion is unmet based on a refrigerant condition at the inlet, the ECU activates the electrical heating element to heat the liquid coolant to a temperature sufficient to cause vaporization of liquid refrigerant present at the inlet.

8. The method of claim 7, wherein once the ECU determines that the compressor start criterion is met based on the refrigerant condition at the inlet resulting from heating by the heating unit, the ECU deactivates the electrical heating element while continuing operation at the coolant unit to circulate liquid coolant through the coolant passage of the refrigerant E-compressor for cooling purposes.

9. A method of operating a vehicle AC system in a vehicle having an engine control unit (ECU), the vehicle AC system including a centrifugal-type refrigerant electric compressor operable to receive refrigerant through an inlet and including a heating unit in heat transfer communication with the inlet, the method comprising:
- starting the vehicle in response to an ignition switch operation;
- receiving an AC start signal indicating that the AC system is to be activated;
- issuing a command to operate the heating unit to cause heat transfer to the refrigerant in the inlet to promote vaporization of liquid refrigerant;
- measuring a temperature and pressure at the inlet to the refrigerant electric compressor;
- determining, by the ECU, a state of the refrigerant at the inlet based on the measured temperature and pressure;
- delaying starting of the refrigerant electric compressor until the refrigerant is determined to be in a vapor state; and
- issuing a command to start the refrigerant electric compressor once the refrigerant is determined to be in the vapor state.

10. The method of claim 9, wherein the refrigerant electric compressor is a centrifugal-type scroll compressor.

11. The method of claim 9, wherein the heating unit is a PTC (positive temperature coefficient) heater disposed in thermal communication with the refrigerant inlet.

12. The method of claim 9, wherein determining the refrigerant state comprises comparing the measured temperature and pressure to a look-up table of saturation values.

13. The method of claim 9, wherein the refrigerant is determined to be in a subcooled liquid state if the measured pressure exceeds a saturation pressure corresponding to the measured temperature.

14. The method of claim 9, wherein the refrigerant is determined to be in a superheated vapor state if the measured pressure is below a saturation pressure corresponding to the measured temperature.

15. The method of claim 9, further comprising continuing operation of the heating unit until the refrigerant is determined to be in the vapor state.

16. The method of claim 9, further comprising logging the temperature, pressure, and refrigerant state determination for fault-detection or diagnostics.

17. The method of claim 9, further comprising disabling a user-requested AC startup if the refrigerant is not in the vapor state within a threshold time period.

18. The method of claim 9, wherein the ECU stores historical refrigerant state data for adaptive compressor control.

19. The method of claim 9, wherein the ECU limits a compressor startup current based on the determined refrigerant state.

20. The method of claim 9, wherein the ECU outputs a visual or audio alert if refrigerant fails to reach the vapor state after a preset heating period.

* * * * *